(12) United States Patent
Kim

(10) Patent No.: US 6,745,436 B2
(45) Date of Patent: Jun. 8, 2004

(54) HINGE APPARATUS FOR A PORTABLE RADIOPHONE HAVING A MULTI-ANGLED HINGE CAM

(75) Inventor: Sang-Hyun Kim, Kumi-shi (KR)

(73) Assignee: Samsung Electronics Co., Ltd. (KR)

(*) Notice: Subject to any disclaimer, the term of this patent is extended or adjusted under 35 U.S.C. 154(b) by 2 days.

(21) Appl. No.: 10/047,142

(22) Filed: Jan. 15, 2002

(65) Prior Publication Data
US 2002/0178546 A1 Dec. 5, 2002

(30) Foreign Application Priority Data
May 31, 2001 (JP) .................. 2001-030472

(51) Int. Cl.[7] ............................ E05C 17/64
(52) U.S. Cl. ............... 16/330; 16/303; 16/341; 379/428; 379/433
(58) Field of Search ............ 16/330, 328, 324, 16/331, 332, 303, 341; 379/428, 433

(56) References Cited

U.S. PATENT DOCUMENTS

| 5,628,089 A | * | 5/1997 | Wilcox et al. | 16/303 |
|---|---|---|---|---|
| 5,697,124 A | * | 12/1997 | Jung | 16/341 |
| 5,704,094 A | * | 1/1998 | Hartigan et al. | 16/303 |
| 6,085,387 A | * | 7/2000 | Han | 16/330 |
| 6,115,886 A | | 9/2000 | Fujita | |
| 6,175,990 B1 | | 1/2001 | Kato et al. | |
| 6,530,121 B2 | * | 3/2003 | Hayashi | 16/330 |

FOREIGN PATENT DOCUMENTS

JP    2001jp-0173649    * 6/2001

OTHER PUBLICATIONS

European Search Report dated Dec. 2, 2003 issued in a counterpart application, namely Appln. No. 02004121.6.

* cited by examiner

Primary Examiner—Gary Estremsky
Assistant Examiner—Mark Williams
(74) Attorney, Agent, or Firm—Dilworth & Barrese LLP (57) ABSTRACT

A hinge apparatus capable of making a folder of a portable communications terminal to stop in any desired angular positions in accordance with an eye level of its user. The hinge apparatus includes a main body having a pair of hinge arms on opposite sides of its opposed end, a folder having its one end a center hinge arm, a hinge housing fixed to the cavity of the center hinge arm, a hinge shaft having an extension part and a sliding peak disposed opposed to the extension part, a hinge cam having a slot for engaging the sliding peak of the hinge shaft. The hinge cam rotates together with the hinge housing. A hinge spring is disposed between the other end of the hinge housing and one end of the hinge cam.

8 Claims, 7 Drawing Sheets

HINGE APPARATUS FOR A PORTABLE RADIOPHONE HAVING A MULTI-ANGLED HINGE CAM

CLAIM OF PRIORITY

The present application makes reference to, incorporates the same herein, and claims all benefits accruing under 35 U.S.C. §119 from an application entitled Hinge Apparatus For Portable Radiophone Having Multi-Angled Hinge filed in the Korean Industrial Property Office on May 31, 2001 and assigned Ser. No. 30472/2001 by the Office.

BACKGROUND OF THE INVENTION

1. Field of the Invention

The present invention relates to a portable communications terminal (i.e., mobile telephone) in a mobile communications system and, in particular, to a hinge apparatus capable of optionally adjusting the extent of opening/closing a folder from a main body of the portable communications terminal.

2. Description of the Related Art

In general, portable communications terminals include a variety of portable radiophones, such as cellular phones, hand-held phones, cordless telephones (CT-2), personal communications service (PCS) phones. Such a portable radiophone carries out radio communication with its adjacent base station in order to provide its user (calling party) with a radio communications service with any called party.

Recently, the radio communications services provided with the portable radiophones have been extending toward a visual (picture) communications service as well as a voice communications service in accordance with rapid development of the telecommunications technology. In the cases where such visual communication is being served, a user needs to face directly toward an eye of camera lens in his radiophone to effect the visual communications with any called party on the phone. When a user watching any visual content, such as a book or a movie on his radiophone, he may often need to adjust an LCD display window, usually located on a folder of his portable radiophone, in a best possible position or viewing angle over its main body. Hence, there is a need for a portable communications terminal capable of optionally adjusting an opening/closure angle of a folder.

Commonly, portable communications terminals are classified into bar type, flip type and folder type according to their appearance. With the development of smaller and lighter terminals, they also include a neck wearable type of phones and a wrist or watch type of phones according to their convenience of wearing. Some of the portable communications terminals are often and optionally provided with a set of lens assemblies to enable the face-to-face visual communication with the called party.

Of the aforementioned three types of portable communications terminals, the flip type or folder type of terminals consists of at least two housings, i.e., a main body and a sub body, of which construction essentially entails a hinge apparatus for pivotally connecting the two housings. This hinge apparatus conventionally serves to couple those two housings, i.e., a main body and a sub body, on a pivot axis and to control the movement of the sub body onto the main with a predetermined limit of opening/closure angle upon using it.

One of such a type of prior art hinge apparatus is disclosed in a Korean patent publication No. 1999-87915, which is commonly assigned to the same assignee of the present application. This hinge apparatus however, is related to a hinge apparatus for providing only a closing drive power into the main body when a folder is positioned closed on the main body, while providing only an opening drive power when the folder is opened by about 45°, and providing only a stopping drive power when the folder is opened by about 150° or more with respect to the main body. Therefore, it is not possible for a user of the portable phone to stop the folder in an angular position of about 100° with respect to the main body upon opening it.

As a result, such a prior art hinge apparatus creates a problem in that it cannot control the folder to halt in a desired angular position with respect to the main body when using the terminal in the visual communications service mode, although it does not create any significant problems when using the terminal in the voice communications service mode. Accordingly, a user of the prior art hinge apparatus is inconvenienced when using the terminal in the visual communications service mode, since he often needs to pose face-to-face with the camera lens of the portable terminal after the folder is fully opened.

Therefore, it is noted that the above prior art hinge apparatus is considerably disadvantageous for comfortably utilizing the mobile visual/picture communications services such as video phone, television watching, electronic books, etc., when placing the portable terminal on a table or desk to use the terminal without being hand held, because the folder is always automatically set to be fully open by a single predetermined angle with respect to the main body. Thus, any free adjustment of the opening angle of the folder is not provided for watching an LCD display window on the folder in its best-suited angle. As a result, a more flexible adjustment of the opening angle of the folder in a foldable terminal is becoming important to meet the users' increasing requirements for the multi-media environment that is very rapidly being introduced into the mobile visual communication service.

SUMMARY OF THE INVENTION

It is, therefore, an object of the present invention to provide a hinge apparatus capable of making a folder of a portable communications terminal stop in any desired angular position in accordance with an eye level of its user, preferably, but not exclusively, when using the terminal in the mobile visual (picture) communications mode such as in video teleconference, video phone, watching on TV/cinema, or e-books, etc., thereby providing the user with more convenience.

It is another object of the present invention to provide a hinge apparatus capable of optionally controlling an opening/closure angle of a folder of a foldable type of portable communications terminal in a desired angular position between 50° and 150° in accordance with an eye level of its user.

Accordingly, to achieve the above and other objects of the present invention, a hinge apparatus for a portable communications terminal includes a main body having no opposite sides at its opposed end a pair of hinge arms positioned apart from each other in an axis; a folder having at one end a center hinge arm disposed between the pair of hinge arms on the same axis, one end of the center hinge arm being provided with a cavity; a hinge housing fixed to the cavity of the center hinge arm on the same axis, one of two opposed ends of the hinge housing being provided with a through hole; a hinge shaft having an extension part further extending to the axial direction through the through hole, and a sliding peak disposed within the hinge housing in the opposed position to the extension part, the extension part being fixedly inserted to a hole of one of the pair of hinge arms; a hinge cam movably disposed within the hinge housing on the axis, having a slot section engaging the sliding peak of the hinge shaft, the hinge cam being rotatable together with the hinge housing; and a hinge spring disposed between the other end of the hinge housing and one end of the hinge cam, having a spring tension in the axial direction.

In one end of the hinge cam, on its guide axis, is formed a pair of projections disposed opposed to each other, and a recessed slot formed in between the pair of projections. In both ends of the projections are respectively formed side sliding surfaces of a first predetermined slanting angle and an upper sloped surface of a second predetermined slanting angle. A guide protrusion is formed in one of the projections so that upon rotation of the folder with respect to the main body, the sliding peak of the hinge shaft come into surface contact with the sloped surface of the hinge cam, causing the folder to stop at the intended angular position.

Preferably, the slot section between the pair of projections may be of the form of V-shape valley.

Preferably, the side sliding surfaces of the pair of projections are slanted to the upper sloped surface of the pair of projections and the upper sloped surfaces of the pair of projections are formed to slant to the opposite direction to each other.

Preferably, the first predetermined slanting angle of the side sliding surfaces of the pair of projections may be of a range from 10 to 20 degrees and the second predetermined slanting angle of the upper sloped surfaces may be of a range from 0 to 10 degrees. Most preferably, a blocking means for preventing further rotation is provided to one end of the projection

BRIEF DESCRIPTION OF THE DRAWINGS

The foregoing and other features and advantages of the present invention will be apparent from the following more detailed description of preferred embodiments as illustrated in the accompanying drawings, wherein same reference characters refer to the same parts or components throughout the various views. The drawings are not necessarily to scale, but the emphasis instead is placed upon illustrating the principles of the invention, wherein.

DETAILED DESCRIPTION OF THE PREFERRED EMBODIMENTS

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For the purpose of simplicity and clarity, detailed descriptions of well-known devices and methods are preferably omitted so as not to obscure the description of the present invention with unnecessary detail.

In the meanwhile, it should be appreciated that the hinge apparatus according to the present invention is not limited to an application to a folder type of portable communications terminal only, but may be also utilized to any similar types of communications terminals, e.g. a flip type of mobile phones, or other similar electronic terminal apparatus or components.

Figure 1:
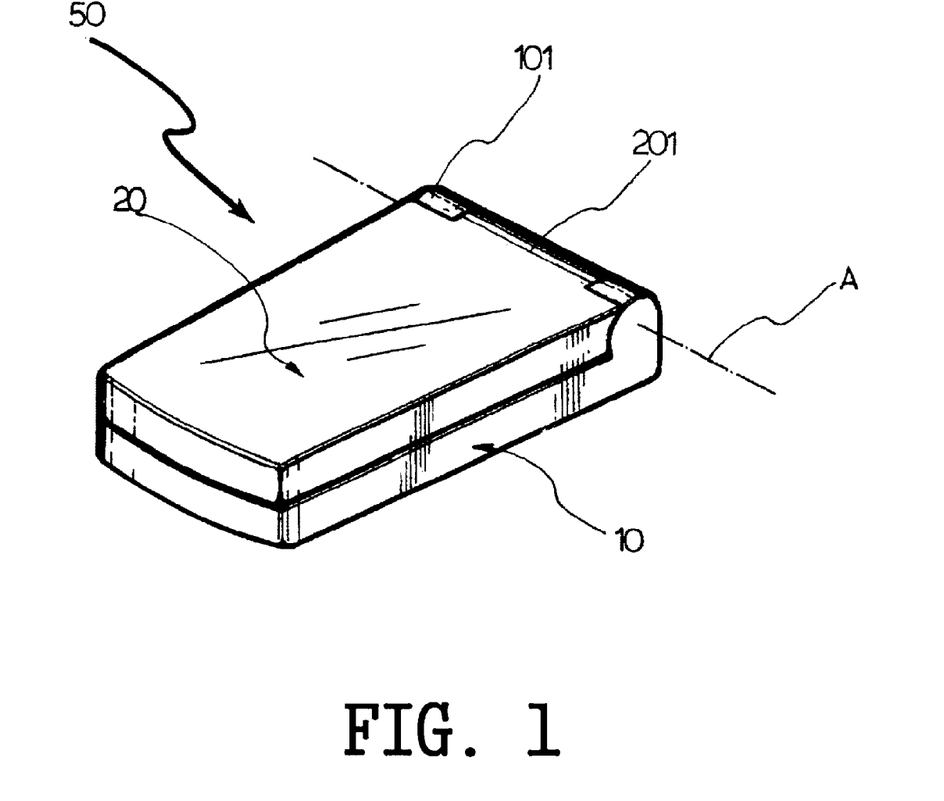
FIG. 1 illustrates a perspective view of a folder type of portable communications terminal with its folder closed onto a main body.

Referring now to FIG. 1, a perspective view of a folder type of portable communications terminal 50 with its folder 20 closed onto a main body 10 in a waiting mode is illustrated. The portable communications terminal 50 has the main body 10, the folder 20 and a hinge apparatus (shown in FIG. 2).

The folder 20 is opened and closed pivotally with respect to a hinge axis A, within an angle range between 0° and 180° to the main body 10. Side hinge arms 101 having a same protrusion, are disposed on one end and opposite sides of the main body 10. At one end of the folder 20 is positioned a center hinge arm 201 of cylindrical form for equipment of a hinge apparatus (shown in FIG. 2). The center hinge arm 201 is disposed between the two side hinge arms 101 and is coupled with the hinge apparatus around the hinge axis A.

Figure 2:
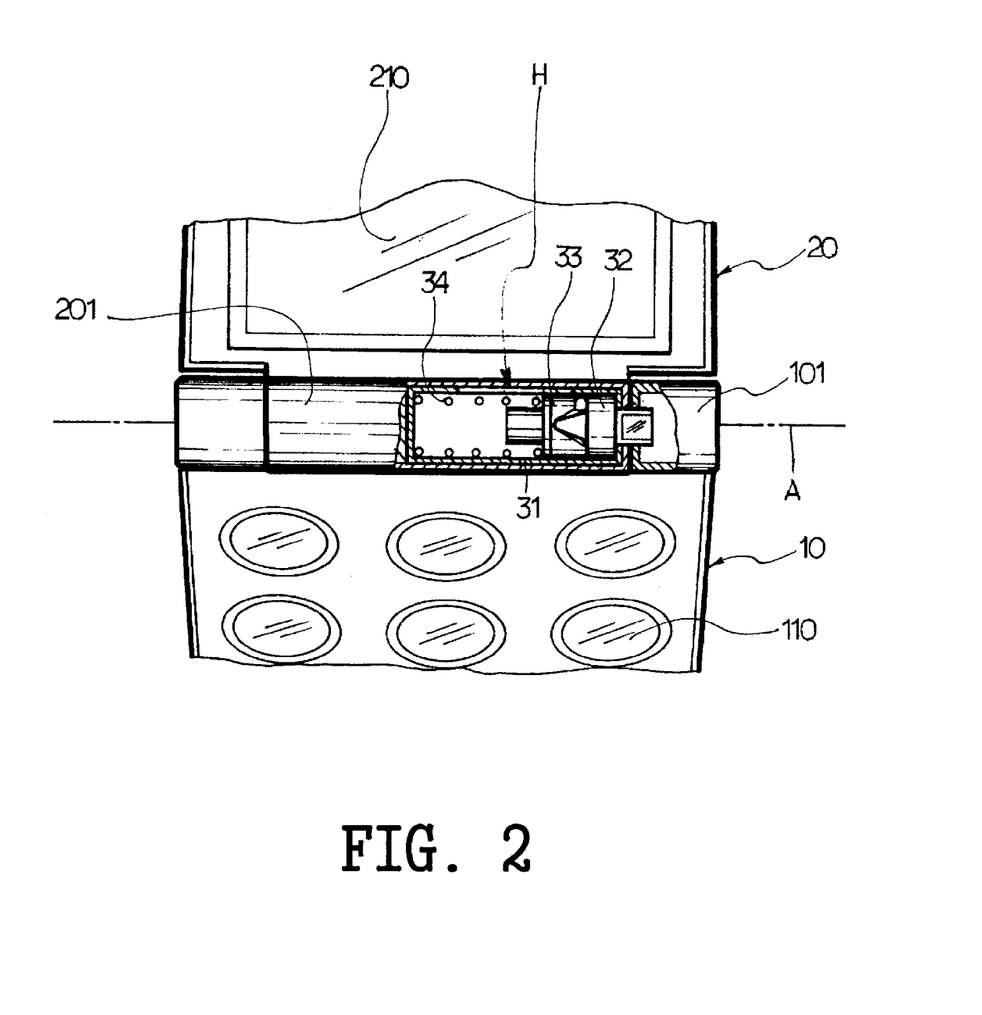
FIG. 2 illustrates a partial sectional front view of a hinge apparatus mounted onto a center hinge arm, according to a preferred embodiment of the present invention, with the folder fully opened from the main body.

Referring to FIG. 2, a partial sectional front view of a hinge apparatus mounted onto a center hinge arm 201 according to a preferred embodiment of the present invention is illustrated. On an upper surface of the main body 10 are arranged a multiplicity of function keys 110 for entry and/or selection of various data and functions. A detailed explanation of the keys is refrained from the present invention for the purpose of simplicity. On one surface of the folder 20 is an LCD display module 210 for displaying the various visual data upon using of the portable terminal 50. The center hinge arm 201 is disposed between both of the side hinge arms 101 concentrically with the hinge axis A, and a hinge module H is internally equipped in one end of the center hinge arm 201.

The hinge module includes a hinge housing 31, a hinge shaft 32 disposed within the hinge housing, a multi-angled hinge cam 33 and a hinge spring 34.

Figure 3:
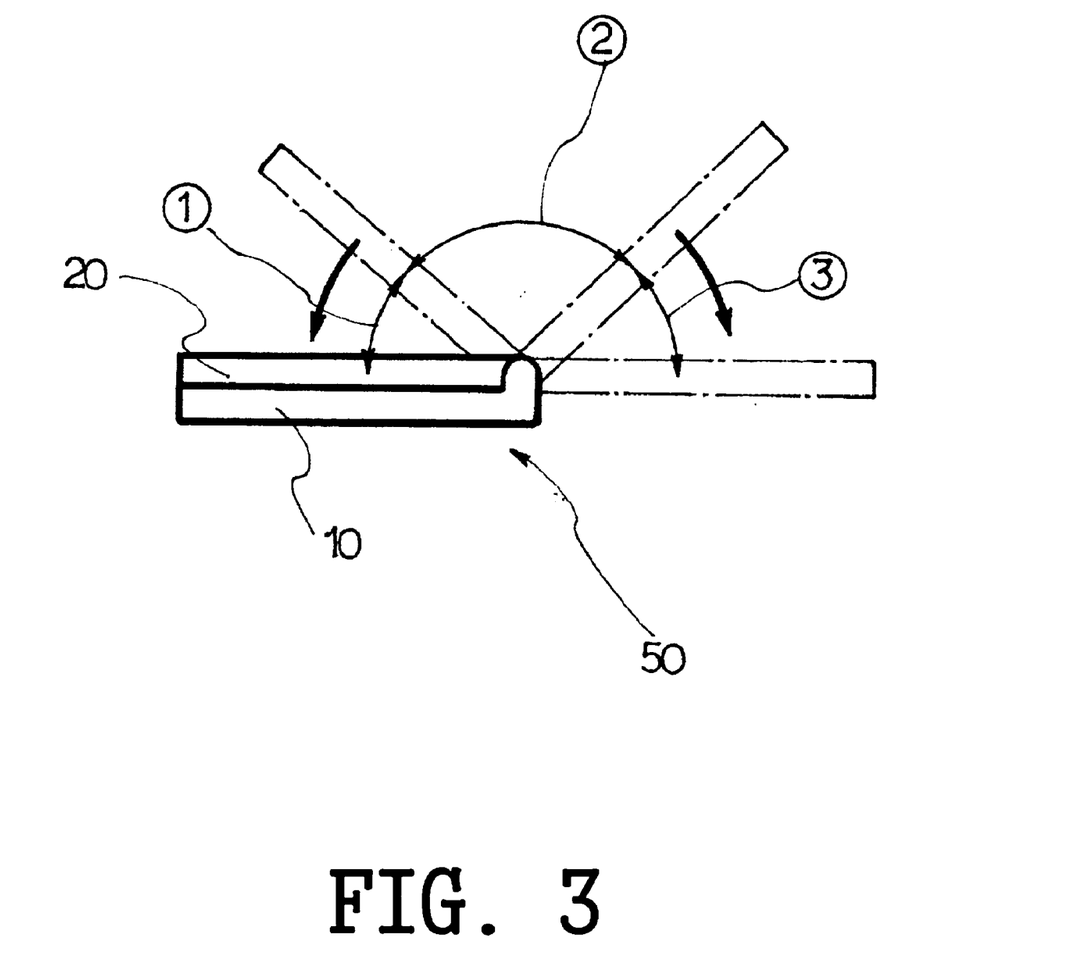
FIG. 3 illustrates a schematic side view of folder opening/closure operations of the portable communications terminal provided with a hinge apparatus according to the preferred embodiment of the present invention.

Referring now to FIG. 3, the folder opening/closure operations of the portable communications terminal provided with the hinge apparatus according to a preferred embodiment of the present invention is explained. A reference numeral 1 indicates a driving range (0° to 50°) for providing the drive power for closing the folder 20, a reference numeral 2 indicates an angle range (50° to 150°) capable of allowing the folder 20 to stop in a given angular position there between, and a reference numeral R indicates a driving range (150° to 180°) for providing the drive power for opening the folder 20. The hinge apparatus according to the present invention enables the user to set up the terminal in the above-mentioned angle ranges for opening/closure control of the folder.

Hereinafter, the structure of the hinge module H according to the present invention is described in more detail.

Figure 4:
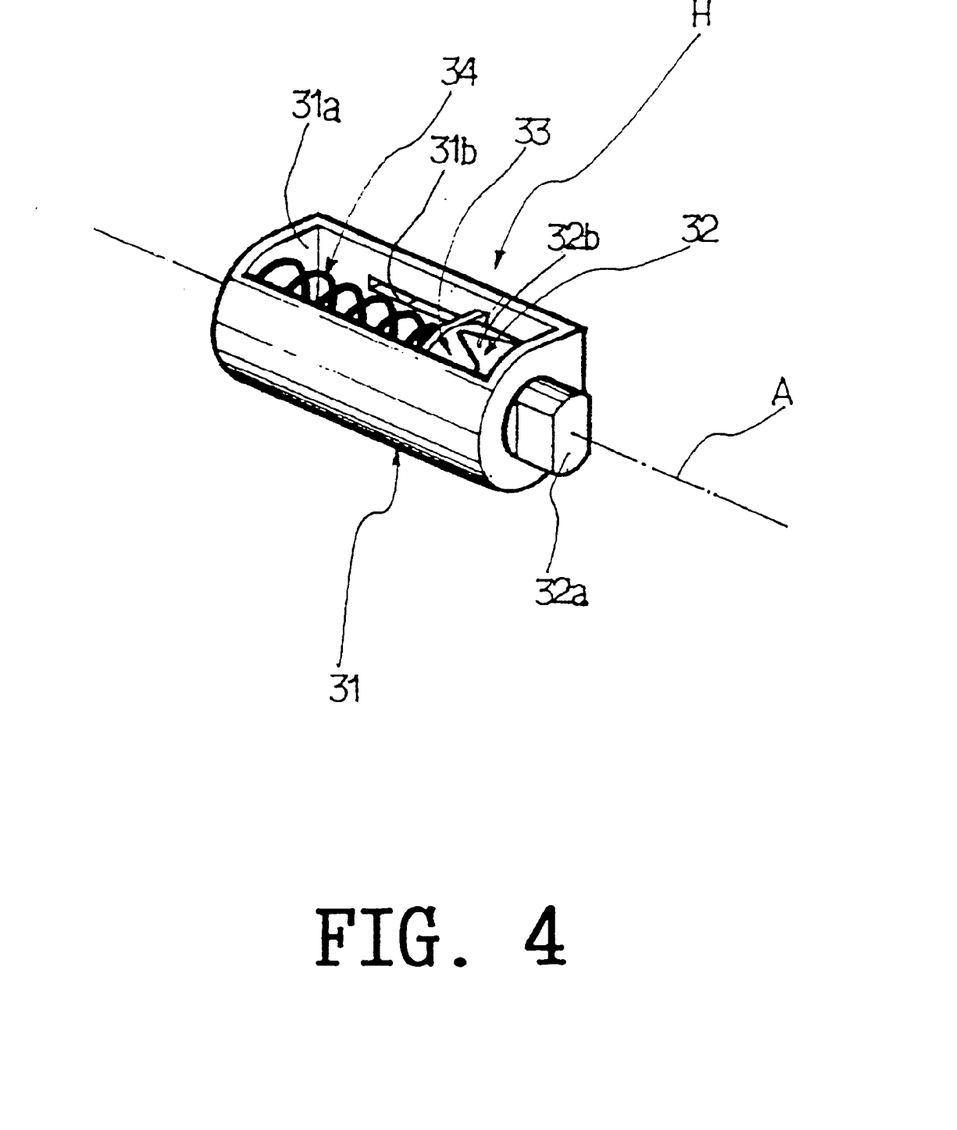
FIG. 4 illustrates a perspective view of the hinge apparatus assembly according to the preferred embodiment of the present invention.

Referring now to FIG. 4, the hinge apparatus module according to a preferred embodiment of the present invention includes a hinge housing 31, a hinge shaft 32 positioned in one end of the hinge housing 31 and coupled with the side hinge arm 101, a multi-angled hinge cam 33, and a hinge spring 34. The multi-angled hinge cam 33 longitudinally moves in a forward or backward direction by sliding movement with the hinge shaft 32 due to a pivoting action of the folder 20. The hinge spring 34 is disposed in the opposite end of the hinge housing 31 and provides a spring tension for creating tight contact between the multi-angled hinge cam 33 and the hinge shaft 32.

The hinge housing 31 is provided with a receiving spacing 31a for receiving the multi-angled hinge cam 33, the hinge shaft 32 and the hinge spring 34, and is further provided in its axial direction with a guide aperture 31b, to which a guide projection 33a (shown in FIG. 6) of the multi-angled hinge cam 33 is inserted, for guiding its straight movement.

The hinge shaft 32 is positioned between the center hinge arm and the side hinge arm to connect each other, when the folder is assembled into the main body. The hinge shaft 32 further extends toward the side hinge arm by an axial end 32a, and a sliding peak 32b is axially disposed within the hinge housing 31. Between the axial end 32a and the sliding peak 32b is formed a blocking part to prevent separation from the hinge housing 31.

Figure 5:
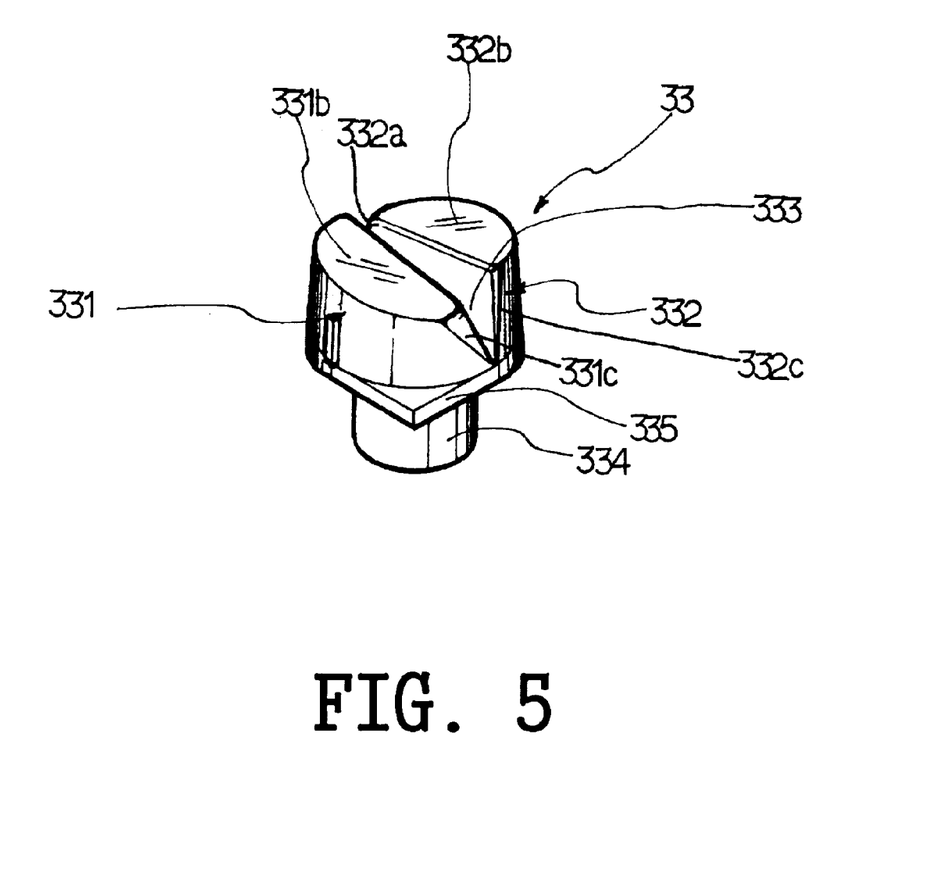
FIG. 5 illustrates a perspective view of a hinge cam of the hinge apparatus assembly according to the preferred embodiment of the present invention.
Figure 6:
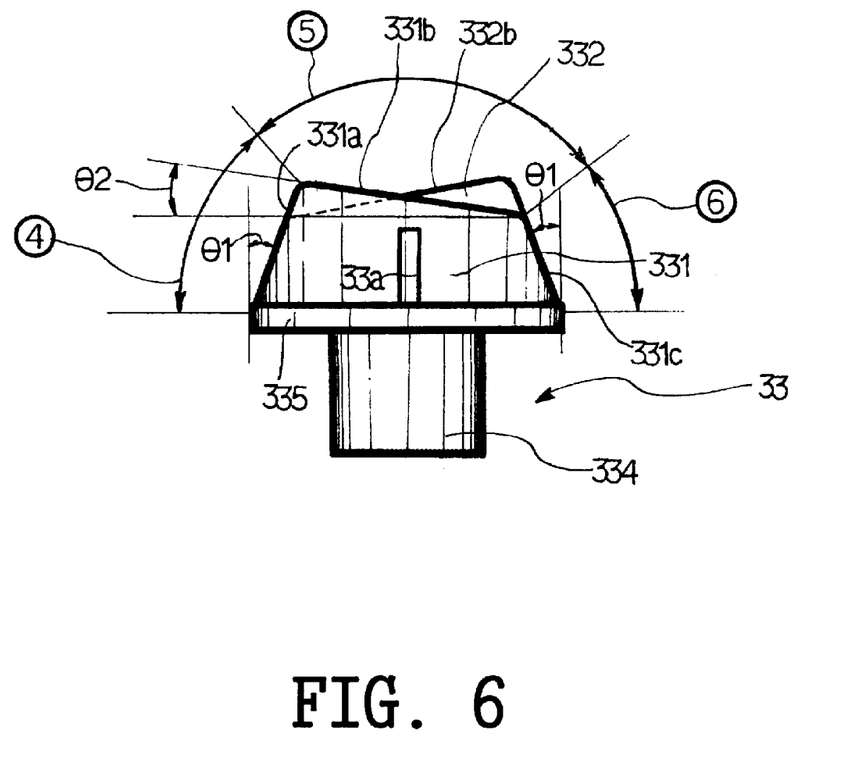
FIG. 6 illustrates a front view of a hinge cam of the hinge apparatus assembly according to the preferred embodiment of the present invention.

Referring now to FIGS. 5 and 6, the multi-angled hinge cam 33 has a pair of first and second projections 331 and 332 oppositely arranged to each other, and a recess slot 333 disposed in between the pair of projections 331 and 332, in one end of a guide shaft 334 around the same axis. In both side ends of the first and second projections 331 and 332 are respectively formed first and second sliding cutting surfaces 331a, 331c and 332a, 332c each having a respective given slope. Similarly, in both upper ends of the first and second projections 331 and 332 are respectively formed first and second sloped surfaces 331b and 332b each having a given slope. In either one of the above first and second projections 331 and 332 is formed a projection guide 33a. The recess slot 333 positioned in between the pair of first and second projections 331 and 332 is in the form of V-shape valley. The side sliding surfaces 331a and 331c, and the sloped surface 331b form a slanted profile of the first projection 331, as seen in FIG. 6. Likewise, the side sliding surfaces 332a and 332c, and the sloped surface 332b form a profile of the second projection 332. The first sloped angle θ1 of these side sliding surfaces is preferably in a range between 0° and 10° for a smoother opening/closure operation of the folder. The sloped surfaces 331b and 332b of the pair of first and second projections are respectively formed to slant to the opposite direction to each other, and the second sloped angle θ2 of the sloped surfaces 331b and 332b are preferably in a range between 0° and 10°. A blocking protrusion 335 for preventing a rotation is formed in a lower side end of the first and second projections 331 and 332. The respective sloping angles θ1 of the first and second side sliding surfaces may be formed different from each other or same to each other, preferably in a range between 0° and 10°.

As seen in FIG. 6, a reference numeral 4 indicates a driving range for providing the drive power for closing the folder 20 by a sliding movement of the hinge shaft 32 and the multi-angled hinge cam 33. A reference numeral 5 indicates a driving range allowing the folder 20 to stop in a desired angular position by a surface contact of the sliding peak 32b of the hinge shaft 32 and the sloped surfaces 331b and 332b of the multi-angled hinge cam. A reference numeral 6 indicates a driving range providing the drive power for fully opening the folder 20 by a sliding movement of the hinge shaft 32 and the multi-angled hinge cam 33.

Therefore, the opening angle of the folder 20 from the main body 10 can be selectively controlled in any desired angle range from 50° to 150°. For example, if a user of the portable terminal should desire its folder to open up by 90°, then the folder can rotate by about 90° and then stop at that position. Likewise, if the user desires his/her folder to open up by e.g., 140°, then the folder can rotate by about 140° and then stop at that position.

Meanwhile, the second projection 332, opposed to the first projection 332 through a slot 333, also has the first and second side sliding surfaces 332a and 332c, and the sloped surface 332b positioned between the first and second side sliding surfaces. Here, the sloped surface 332b has an opposite slanting direction to that of the sloped surface 331b. Further, the slanting angles of the first and second side sliding surfaces 332a and 332c of the second projection 332 are formed identical to those (θ1) of the first projection 331.

As a result, the slanting angle of the sloped surfaces 331b and 332b of the multi-angled hinge cam 33, is not so high, that is to say, slow-changing, that a lift-up movement of the folder could stop at a desired angle. As a result, if the folder is provided with a lens assembly, the user can keep his own eyes face the lens eye on the folder in the most convenient position for watching.

Figure 7A:
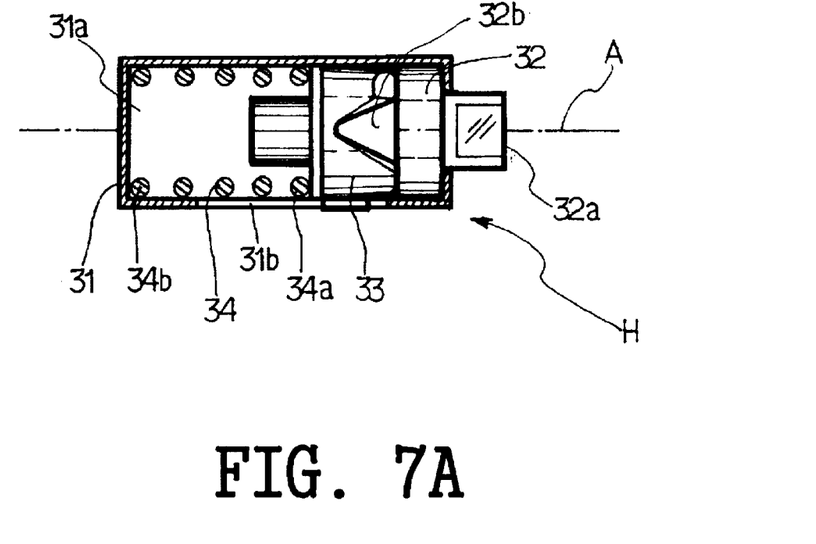
FIG. 7A illustrates a schematic view of structure of the hinge apparatus assembly according to the preferred embodiment of the present invention, with the folder fully closed or opened.

As shown in FIG. 7A, which illustrates the structure of the hinge apparatus module according to a preferred embodiment of the present invention, the hinge spring 34 is positioned in the hinge housing 31 in its axial direction. One end 34a of the hinge spring 34 contacts the multi-angled hinge cam 33, and the other end 34b thereof contacts the hinge housing 31. The hinge spring 34 is compressed or restored according to the opening/closure operation of the folder. In addition, the hinge spring provides both the sliding peak 32b of the hinge shaft and the multi-angled hinge cam with a contacting force.

When the folder is fully closed onto the main body, the sliding peak 32b of the hinge shaft is located in the slot 333 of the multi-angled hinge cam 33, and the hinge shaft is in the most stable position. Further, when the folder is open by about 50° from the main body, the hinge apparatus works such that the multi-angled hinge cam 33, moving toward an axial direction by sliding with the sliding peak 32b, is positioned in a higher part of the sloped surfaces 331b and 332b of the first and second projection 331 and 332. At this time, the multi-angled hinge cam 33 moves straight toward the other end 34b of the hinge housing, when the hinge spring 34 contracts into the most compressed position.

Figure 7B:
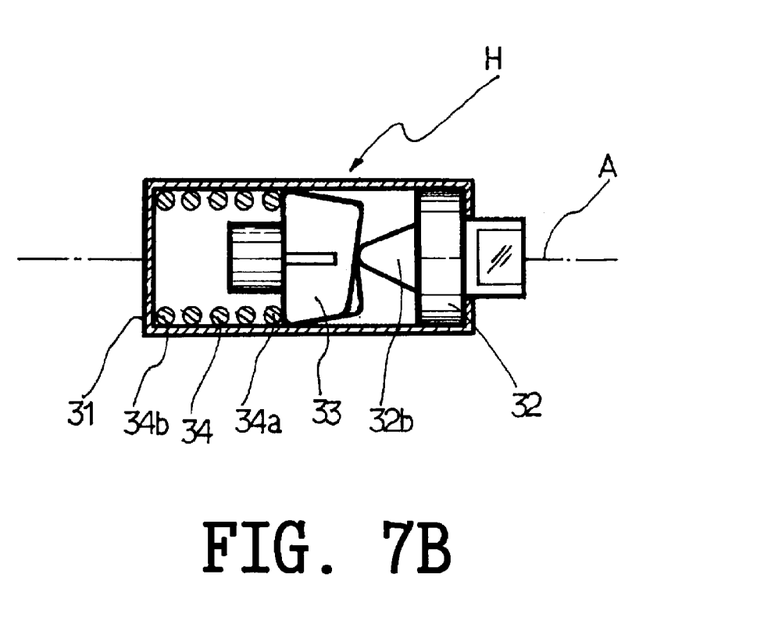
FIG. 7B illustrates a schematic view of structure of the hinge apparatus assembly according to the preferred embodiment of the present invention, with the folder opened up by about 90 degrees with respect to a main body.

Referring now to FIG. 7B, the structure of the hinge module apparatus according to a preferred embodiment of the present invention, with the folder opened up by about 90 degrees with respect to a main body, is explained. When the folder rotates by about 90 degrees with respect to a main body, the hinge shaft is fixed to the side hinge arm of the main body, so it is kept firmly, thereby allowing the hinge housing to rotate with the folder. Accordingly, the sliding peak 32b of the hinge shaft 32 is arranged, so that in its fixed state, its end is positioned in the middle of the sloped surface 331b and 332b of the first and second projections. The multi-angled hinge cam 33 rotates together with the hinge housing 31 and moves in the axial direction, so that it comes into contact with the sliding peak 32b of the hinge shaft in the middle of the sloped surface 331b and 332b of the first and second projections, when the hinge spring is forced to be in its compressed position.

When the folder is fully open from the main body, it is rotated by 180° with respect to the main body. As seen in FIG. 7A, the sliding peak of the hinge shaft is inserted into the slot recess of the hinge cam 33, causing the multi-angled hinge cam to rotate by 180° fully.

As apparent from the foregoing description, it is appreciated that the hinge apparatus according to the present invention provides a new type of improved hinge apparatus, in which if the hinge housing rotates as the folder rotates, then the multi-angled hinge cam and the hinge spring except for the hinge shaft is allowed to rotate together. The multi-angled hinge cam serves to support the opening/closure operation of the folder with the sliding movement and surface contact with the sliding peak. As a result, when using the portable communications terminals with the inventive hinge module apparatus according to the present invention, the user is able to position the folder at the most convenient or preferred angular position for most suitably watching the display module on the folder.

Also, it should be appreciated that the hinge apparatus according to the present invention is not limited to an application to a folder type of portable terminal only, but may be also utilized to any similar types of communications terminals, e.g. a flip type of mobile phones, or other similar electronic terminal apparatus or components.

While the preferred embodiments of the present invention have been illustrated and described, it will be understood by those skilled in the art that various changes and modifications may be made, and equivalents may be substituted for elements thereof without departing from the true scope of the present invention. Therefore, it is intended that the present invention not be limited to the particular embodiment disclosed as the best mode contemplated for carrying out the present invention. Instead, it is intended that the present invention include all embodiments falling within the scope of the appended claims.

What is claimed is:

1. A hinge apparatus for a portable communications terminal, comprising:
    a main body having on one end a pair of hinge arms positioned apart from each other along an axis;
    a folder having at one end a center hinge arm disposed between the pair of hinge arms along the same axis, one end of the center hinge arm being provided with a cavity;
    a hinge housing fixed to the cavity of the center hinge arm along the same axis, a first end of the hinge housing being provided with a through hole;
    a hinge shaft having an extension part extending in the axial direction through the through hole, and a sliding peak disposed within the hinge housing in opposed relation to the extension part, the extension part being fixedly inserted in a hole on one of the pair of hinge arms;
    a hinge cam movably disposed within the hinge housing along the axis and configured to engage the sliding peak of the hinge shaft, the hinge cam being rotatable with the hinge housing; and
    a hinge spring disposed between a second end of the hinge housing and the hinge cam, having spring tension in the axial direction;
    wherein the hinge cam has a frustoconical cross-section and a pair of axially extending projections disposed opposed to each other, and a recessed slot formed in between the pair of projections, the pair of projections each having side sliding surfaces, which converge towards one another at a first predetermined slanting angle and an upper sloped surface topping the side sliding surfaces and having a second predetermined slanting angle, such that one of the pair of projections has a guide protrusion, so that upon rotation of the folder with respect to the main body, the sliding peak of the hinge shaft comes into surface contact with the upper sloped surfaces of the hinge cam, causing the folder to selectively stop at a plurality of angular positions located along an angular path of the folder, which ranges between 50° and 150°.

2. The hinge apparatus according to claim 1, wherein the recessed slot section between the pair of projections is in a form of a V-shaped valley.

3. A hinge apparatus for a portable communications terminal, comprising:
    a main body having on one end a pair of hinge arms positioned apart from each other along an axis;
    a folder having at one end a center hinge arm disposed between the pair of hinge arms along the same axis, one end of the center hinge arm being provided with a cavity;
    a hinge housing fixed to the cavity of the center hinge arm along the same axis, a first end of the hinge housing being provided with a through hole;
    a hinge shaft having an extension part extending in the axial direction through the through hole, and a sliding peak disposed within the hinge housing in opposed relation to the extension part, the extension part being fixedly inserted in a hole on one of the pair of hinge arms;
    a hinge cam movably disposed within the hinge housing along the axis and configured to engage the sliding peak of the hinge shaft, the hinge cam being rotatable with the hinge housing; and
    a hinge spring disposed between a second end of the hinge housing and the hinge cam, having spring tension in the axial direction;
    wherein the hinge cam has a frustoconical cross-section and includes a pair of axially extending projections disposed opposed to each other, and a recessed slot formed in between the pair of projections, the pair of projections each having side sliding surfaces, which converge towards one another at a first predetermined slanting angle in a range from 10 to 20 degrees and an upper sloped surface topping the side sliding surfaces and having a second predetermined slanting angle, such that one of the pair of projections has a guide protrusion, so that upon rotation of the folder with respect to the main body, the sliding peak of the hinge shaft comes into surface contact with the upper sloped surfaces of the hinge cam, causing the folder to selectively stop at a plurality of angular positions located along an angular path of the folder, which ranges between 50° and 150°.

4. The hinge apparatus according to claim 1, wherein the upper sloped surfaces of the pair of projections are formed to slant in an opposite direction of each other.

5. The hinge apparatus according to claim 4, wherein the second predetermined slanting angle of the upper sloped surfaces of the pair of projections is in a range from 0 to 10 degrees.

6. The hinge apparatus according to claim 1, wherein a blocking means for preventing further rotation is provided to one end of each projection.

7. A hinge apparatus for a portable communications terminal, comprising:

a main body and a folder pivotally displaceable relative to one another about a pivot axis and along an angular path between a fully closed position and a fully open position of the folder; and a hinge assembly extending axially between and coupled to the main body and the folder, the hinge assembly having a hinge cam provided with a pair of opposed projections, each projection having respective spaced side sliding surfaces converging towards one another and topped by a respective slanted top sliding surface, wherein the hinge cam has a frustoconical cross-section configured to stop displacement of the main body and the folder relative to one another at a plurality of partially open positions of the folder before the folder reaches the fully open position.

8. The hinge apparatus of claim 7, wherein the hinge assembly is operative to selectively stop the displacement of the folder and the main body relative to one another at the plurality of partially open positions along the angular path.

* * * * *